United States Patent
Kubota et al.

(10) Patent No.: US 11,524,669 B2
(45) Date of Patent: Dec. 13, 2022

(54) BRAKE CONTROLLER

(71) Applicants: ADVICS CO., LTD., Kariya (JP); TOYOTA JIDOSHA KABUSHIKI KAISHA, Toyota (JP)

(72) Inventors: Hayato Kubota, Kariya (JP); Daisuke Nakata, Seto (JP)

(73) Assignees: ADVICS CO., LTD., Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 355 days.

(21) Appl. No.: 16/711,994

(22) Filed: Dec. 12, 2019

(65) Prior Publication Data
US 2020/0238964 A1 Jul. 30, 2020

(30) Foreign Application Priority Data
Jan. 25, 2019 (JP) .............................. JP2019-010760

(51) Int. Cl.
*B60T 8/32* (2006.01)
*B60W 10/188* (2012.01)
(Continued)

(52) U.S. Cl.
CPC .......... *B60T 13/662* (2013.01); *B60T 8/3265* (2013.01); *B60W 10/188* (2013.01);
(Continued)

(58) Field of Classification Search
CPC ........ B60T 13/662; B60T 8/3265; B60T 1/10; B60T 7/042; B60T 2270/604;
(Continued)

(56) References Cited

U.S. PATENT DOCUMENTS 5,067,778 A * 11/1991 Testardi .................... B60T 8/00
303/119.2
5,480,221 A * 1/1996 Morita .................... B60T 8/328
303/113.5
(Continued)

FOREIGN PATENT DOCUMENTS

CN       108137012 A       6/2018
CN       109532817 A  *    3/2019  ............ B60W 20/14
(Continued)

OTHER PUBLICATIONS

WO2012034740A1.English.Translate (Year: 2012).*
(Continued)

*Primary Examiner* — B M M Hannan
(74) *Attorney, Agent, or Firm* — Buchanan Ingersoll & Rooney PC

(57) ABSTRACT

A brake controller according to the present disclosure that changes an effect correlation value correlating to an effect of braking in a first braking system provided in a vehicle in accordance with a vehicle condition of the vehicle includes a control part generating a braking force by at least one of the first braking system and a second braking system different from the first braking system in a case where the vehicle condition is a first condition based on a braking distribution ratio different from that in a case where the vehicle condition is a second condition and a setting part setting the effect correlation values so as to be different from each other in the case where the vehicle condition is the first condition and in the case where the vehicle condition is the second condition.

2 Claims, 2 Drawing Sheets

(51) Int. Cl.
  *B60W 10/192* (2012.01)
  *B60T 13/66* (2006.01)
  *B60W 20/14* (2016.01)
  *B60W 10/18* (2012.01)
(52) U.S. Cl.
  CPC .......... *B60W 10/192* (2013.01); *B60W 20/14* (2016.01); *B60W 10/182* (2013.01)
(58) Field of Classification Search
  CPC .......... B60T 8/4081; B60T 8/17; B60T 8/409; B60T 8/44; B60W 10/188; B60W 10/192; B60W 20/14; B60W 10/182; B60W 10/08; B60W 30/18127; F16D 57/04
  USPC .......................................................... 701/70
  See application file for complete search history.

(56) References Cited

U.S. PATENT DOCUMENTS

| | | | | |
|---|---|---|---|---|
| 5,615,932 | A * | 4/1997 | Okazaki | B60T 8/17636 303/198 |
| 6,607,253 | B1 * | 8/2003 | Yamamoto | B60T 7/042 303/155 |
| 6,719,076 | B1 * | 4/2004 | Tabata | B60L 50/61 903/910 |
| 8,332,113 | B2 * | 12/2012 | Yasui | B60T 13/686 180/197 |
| 8,366,210 | B2 * | 2/2013 | Maki | B60W 30/18127 303/151 |
| 2001/0020800 | A1 * | 9/2001 | Isono | B60T 13/165 303/113.5 |
| 2004/0108771 | A1 * | 6/2004 | Tsunehara | B60T 13/741 303/155 |
| 2004/0212245 | A1 * | 10/2004 | Tsunehara | B60T 8/4081 303/3 |
| 2005/0269875 | A1 * | 12/2005 | Maki | B60T 8/38 303/152 |
| 2006/0041366 | A1 * | 2/2006 | Kato | B60T 8/1755 701/72 |
| 2007/0222289 | A1 * | 9/2007 | Fukuda | B60T 8/1769 303/192 |
| 2008/0210497 | A1 * | 9/2008 | Jeon | B60T 8/267 188/72.1 |
| 2008/0221766 | A1 * | 9/2008 | Maeda | B60T 8/1755 701/70 |
| 2008/0236959 | A1 * | 10/2008 | Hashida | B60T 8/4077 188/72.2 |
| 2009/0012687 | A1 * | 1/2009 | Maeda | B60W 30/02 701/70 |
| 2009/0051304 | A1 * | 2/2009 | Muta | B60L 7/26 903/947 |
| 2009/0120707 | A1 * | 5/2009 | Yoneda | B60T 8/17555 180/248 |
| 2010/0036577 | A1 * | 2/2010 | Kodama | B60L 7/26 701/76 |
| 2010/0062897 | A1 * | 3/2010 | Nishino | B60T 7/042 477/29 |
| 2010/0117445 | A1 * | 5/2010 | Kato | B60T 8/442 303/11 |
| 2010/0174430 | A1 * | 7/2010 | Irie | B60W 10/18 701/31.4 |
| 2010/0270855 | A1 * | 10/2010 | Sawada | B60T 8/1766 303/113.2 |
| 2011/0049969 | A1 * | 3/2011 | Park | B60L 7/12 303/3 |
| 2012/0130573 | A1 * | 5/2012 | Wu | B60T 8/17555 701/22 |
| 2012/0226402 | A1 * | 9/2012 | Minamiura | B60L 7/18 180/65.21 |
| 2014/0062176 | A1 * | 3/2014 | Nishida | B60T 13/586 303/3 |
| 2015/0000266 | A1 * | 1/2015 | Murayama | B60T 13/145 60/591 |
| 2015/0210256 | A1 * | 7/2015 | Yamashita | B60T 13/662 303/14 |
| 2016/0167527 | A1 * | 6/2016 | Jeon | B60L 7/26 701/70 |
| 2016/0200301 | A1 * | 7/2016 | Kamiya | B60T 7/042 303/115.1 |
| 2016/0221468 | A1 * | 8/2016 | Suzuki | B60L 15/2009 |
| 2016/0221553 | A1 * | 8/2016 | Watanabe | B60T 8/4081 |
| 2016/0236672 | A1 * | 8/2016 | Yanagida | B60W 10/06 |
| 2017/0066331 | A1 * | 3/2017 | Jeon | B60T 8/4081 |
| 2017/0120882 | A1 | 5/2017 | Ninoyu et al. | |
| 2017/0137031 | A1 * | 5/2017 | Yamaguchi | B60L 15/2009 |
| 2017/0240154 | A1 * | 8/2017 | Kashiwai | B60T 8/1812 |
| 2018/0015914 | A1 * | 1/2018 | Okano | B60T 13/686 |
| 2018/0272872 | A1 * | 9/2018 | Okano | B60T 8/4077 |
| 2018/0339683 | A1 * | 11/2018 | Ninoyu | B60T 13/662 |
| 2019/0100184 | A1 * | 4/2019 | Ishida | B60T 8/40 |
| 2019/0184958 | A1 * | 6/2019 | Watanabe | B60T 13/686 |
| 2019/0193695 | A1 * | 6/2019 | Ninoyu | B60T 13/14 |
| 2021/0001859 | A1 * | 1/2021 | Nishiura | B60W 30/18172 |
| 2021/0070271 | A1 * | 3/2021 | Wakabayashi | B60T 7/042 |
| 2022/0009460 | A1 * | 1/2022 | Nishiura | B60T 13/686 |

FOREIGN PATENT DOCUMENTS

| | | | | |
|---|---|---|---|---|
| DE | 102010040854 | A1 * | 3/2012 | ............ B60T 13/162 |
| DE | 102015204764 | A1 * | 9/2016 | ............ B60T 13/662 |
| EP | 2332796 | A1 * | 6/2011 | ............. B60T 13/72 |
| JP | 2000-229564 | A | 8/2000 | |
| JP | 2000229564 | A * | 8/2000 | |
| JP | 2011121535 | A * | 6/2011 | |
| JP | 2015-066952 | A | 4/2015 | |
| JP | 2015-182639 | A | 10/2015 | |
| WO | WO-2012034740 | A1 * | 3/2012 | ............ B60T 13/162 |
| WO | WO-2017042209 | A1 * | 3/2017 | .......... B60L 15/2009 |
| WO | WO-2018052095 | A1 * | 3/2018 | ............... B60T 8/17 |
| WO | WO-2019054189 | A1 * | 3/2019 | ............. B60T 13/74 |

OTHER PUBLICATIONS

WO2019054189.English.translate (Year: 2019).*
WO2019054189A1.FOR.ABSTRACT (Year: 2019).*
Office Action (First Office Action) dated Dec. 3, 2021, by the State Intellectual Property Office of People's Republic of China in corresponding Chinese Patent Application No. 202010052420.X and an English Translation of the Office Action. (11 pages).
Office Action (Notice of Reasons for Refusal) dated Jun. 21, 2022, by the Japanese Patent Office in corresponding Japanese Patent Application No. 2019-010760 and an English Translation of the Office Action. (6 pages).

* cited by examiner

BRAKE CONTROLLER

CROSS REFERENCE TO RELATED APPLICATIONS

Priority is claimed on Japanese application No. 2019-010760, filed Jan. 25, 2019 the content of which is incorporated herein by reference.

BACKGROUND OF THE INVENTION

Technical Field

The present invention relates to a brake controller.

Background Art

The brake controller sets a target deceleration, for example, in accordance with an operation of a brake pedal, and controls a braking system based on the target deceleration. Here, in a brake controller described in, for example, JP-A-2000-229564, a weight is changed in accordance with driving states of a vehicle such as a high-speed running state, a mountain running state or a traffic-jam running state to change the deceleration.

SUMMARY OF THE INVENTION

Here, in a case where the deceleration of the vehicle is changed by control, not by the braking operation of a driver, the driver may feel different brake feelings with respect to the same braking operation. The driver may feel a sense of incongruity when the weight is changed with respect to the same braking operation. On the other hand, there may be a case where the brake feeling can be improved by changing the weight depending on a vehicle condition.

The present invention has been made in view of the above circumstances, and an object thereof is to provide a brake controller capable of suppressing the sense of incongruity given to the driver during braking.

A brake controller according to the present disclosure that changes an effect correlation value correlating to an effect of braking in a first braking system provided in a vehicle in accordance with a vehicle condition of the vehicle includes a control part generating a braking force by at least one of the first braking system and a second braking system different from the first braking system in a case where the vehicle condition is a first condition based on a braking distribution ratio different from that in a case where the vehicle condition is a second condition, and a setting part setting the effect correlation values so as to be different from each other in the case where the vehicle condition is the first condition and in the case where the vehicle condition is the second condition.

According to the present disclosure, the braking distribution ratio is changed in the first braking system and the second braking system in a case where the vehicle condition is changed between the first condition and the second condition. Then, the effect correlation value is changed so as to correspond to the timing when the braking distribution ratio is changed. A change in a brake feeling generated by changing the effect correlation value can be diverted by a change in the brake feeling generated by changing the braking distribution ratio that is originally allowed for the driver. Accordingly, the driver does not easily feel the change in the brake feeling due to the change of the effect correlation value. According to the present disclosure, it is possible to suppress the sense of incongruity given to the driver by the change of the effect correlation value.

DETAILED DESCRIPTION OF INVENTION

Figure 1:
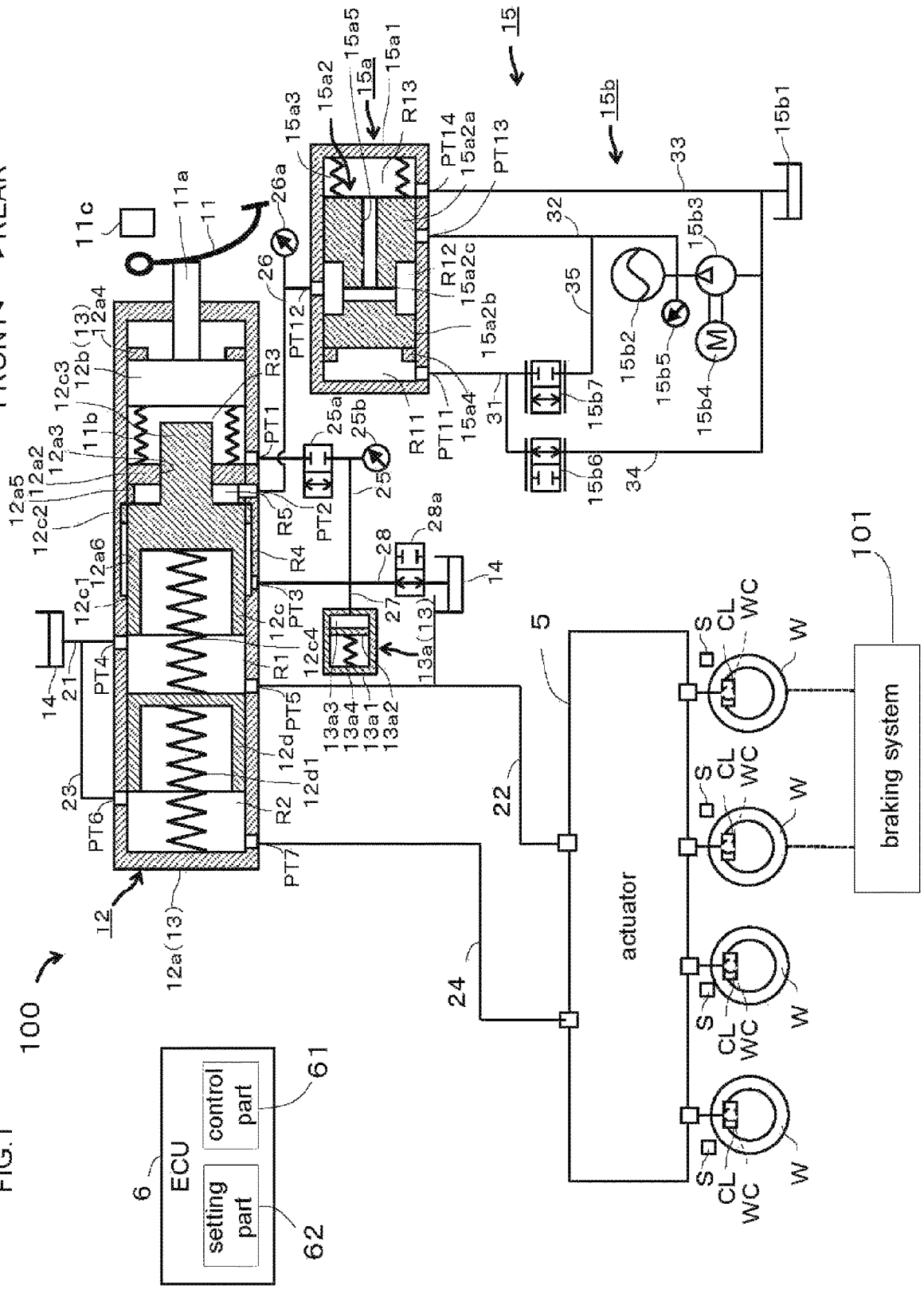
FIG. 1 is a configuration diagram of a hydraulic braking system and a regenerative braking system according to an embodiment.

Hereinafter, an embodiment of the present disclosure will be explained with reference to the drawings. Respective drawings used for explanation are conceptual diagrams. A vehicle is provided with a hydraulic braking system (corresponding to a "first braking system") 100 braking the vehicle by applying hydraulic braking forces to respective wheels W. The vehicle is also provided with a regenerative braking system (corresponding to a "second braking system) 101 applying regenerating braking forces to front wheels W and/or rear wheels W. Note that wheel speed sensors S are provided in respective wheels W.

The hydraulic braking system 100 is a system applying the hydraulic braking forces corresponding to hydraulic pressures inside wheel cylinders WC to the wheels W. Specifically, the hydraulic braking system 100 includes a brake pedal 11, a master cylinder 12, a stroke simulator part 13, a reservoir 14, a booster mechanism 15, an actuator 5, a brake ECU 6, and the wheel cylinders WC. The brake ECU 6 configures a brake controller (6) according to the embodiment.

The wheel cylinder WC regulates the rotation of the wheel W, which is provided in a caliper CL. The wheel cylinder WC is a braking-force applying mechanism, to which brake fluid is supplied from the actuator 5, applying the braking force to the wheel W of the vehicle based on a wheel pressure as the hydraulic pressure inside the wheel cylinders WC.

The brake pedal 11 is a kind of brake operating members and connected to the stroke simulator part 13 and the master cylinder 12 through an operation rod 11a.

A stroke sensor 11c detecting a stroke that is an operation amount of the brake pedal 11 is provided in the vicinity of the brake pedal 11. The stroke sensor 11c transmits a detected result to the brake ECU 6.

The master cylinder 12 is a device supplying the brake fluid to the actuator 5 in accordance with the stroke of the brake pedal 11. The master cylinder 12 includes a cylinder body 12a, an input piston 12b, a first master piston 12c, a second master piston 12d and the like.

The cylinder body 12a is formed in a bottomed approximately cylindrical shape. A partition part 12a2 protruding in an inward flange shape is provided in an inner peripheral part of the cylinder body 12a. A through hole 12a3 piercing in a front and rear direction is formed in the center of the partition part 12a2. The first master piston 12c and the second master piston 12d are arranged at a front portion of the partition part 12a2 in the inner peripheral part of the cylinder body 12a so as to be liquid-tight and so as to move along an axial direction.

The input piston 12b is arranged at a rear portion of the partition part 12a2 in the inner peripheral part of the cylinder body 12a so as to be liquid-tight and so as to move along the axial direction. The input piston 12b is a piston sliding inside the cylinder body 12a in accordance with the operation of the brake pedal 11.

The operation rod 11a interlocked with the brake pedal 11 is connected to the input piston 12b. The input piston 12b is biased in a direction expanding a first hydraulic chamber R3, namely, in a rear direction (a right direction in the drawing) by a compression spring 11b. When the brake pedal 11 is stepped on, the operation rod 11a advances against a biasing force of the compression spring 11b. When the operation rod 11a advances, the input piston 12b also advances in conjunction with the operation rod 11a. When the step-on operation of the brake pedal 11 is released, the input piston 12b is retracted by the biasing force of the compression spring 11b and abuts on a regulating protrusion 12a4 to be positioned.

The first master piston 12c is formed so that a pressure cylinder part 12c1, a flange part 12c2 and a protruding part 12c3 are integrated in order from a front side. The pressure cylinder part 12c1 is formed in a bottomed approximately cylindrical shape having an opening in the front and a bottom surface in the rear. The pressure cylinder part 12c1 is arranged so as to be slidable with respect to an inner peripheral surface of the cylinder body 12a. A coil spring 12c4 as a biasing member is arranged between the pressure cylinder part 12c1 and the second master piston 12d. The first master piston 12c is biased to a rear direction by the coil spring 12c4. The first master piston 12c abuts on a regulating protrusion 12a5 to be positioned. The position is a position where the step-on operation of the brake pedal 11 is released and the brake pedal 11 is stopped, namely, an initial position (a predetermined position).

The flange part 12c2 is formed to have a larger diameter than the pressure cylinder part 12c1. The flange part 12c2 is arranged so as to be slidable with respect to an inner peripheral surface of a large-diameter part 12a6 inside the cylinder body 12a. The protruding part 12c3 is formed to have a smaller diameter than the pressure cylinder part 12c1. The protruding part 12c3 is arranged so as to be slidable with respect to the through hole 12a3 of the partition part 12a2. A rear end of the protruding part 12c3 pierces through the through hole 12a3 and protrudes in an inner space of the cylinder body 12a, which is separated from the inner peripheral surface of the cylinder body 12a. A rear end surface of the protruding part 12c3 is separated from a bottom surface of the input piston 12b, which is configured so that a clearance therebetween can be changed.

The second master piston 12d is arranged on the front side of the first master piston 12c inside the cylinder body 12a. The second master piston 12d is formed in a bottomed approximately cylindrical shape having an opening in the front and a bottom surface in the rear. A coil spring 12d1 as a biasing member is arranged between the second master piston 12d and an inner bottom surface of the cylinder body 12a. The second master piston 12d is biased in the rear direction by the coil spring 12d1. The second master piston 12d is biased by the coil spring 12d1 toward the initial position of itself.

Additionally, a first master chamber R1, a second master chamber R2, the first hydraulic chamber R3, a second hydraulic chamber R4, and a servo chamber (hydraulic chamber) R5 are formed inside the master cylinder 12. In the explanation, the first master chamber R1 and the second master chamber R2 may be collectively written as master chambers R1, R2. The first master chamber R1 is formed to be demarcated by the inner peripheral surface of the cylinder body 12a, the first master piston 12c (the front side of the pressure cylinder part 12c1), and the second master piston 12d. The first master chamber R1 is connected to the reservoir 14 through an oil passage 21 connected to a port PT4. The first master chamber R1 is also connected to the actuator 5 through an oil passage 22 connected to a port PT5.

The second master chamber R2 is formed to be demarcated by the inner peripheral surface of the cylinder body 12a and the front side of the second master piston 12d. The second master chamber R2 is connected to the reservoir 14 through an oil passage 23 connected to a port PT6. The second master chamber R2 is also connected to the actuator 5 through an oil passage 24 connected to a port PT7.

The first hydraulic chamber R3 is formed between the partition part 12a2 and the input piston 12b. The first hydraulic chamber R3 is formed to be demarcated by the inner peripheral surface of the cylinder body 12a, the partition part 12a2, the protruding part 12c3 of the first master piston 12c, and the input piston 12b. The second hydraulic chamber R4 is formed on a side of the pressure cylinder part 12c1 of the first master piston 12c. The second hydraulic chamber R4 is formed to be demarcated by the inner peripheral surface of the large-diameter part 12a6 on the inner peripheral surface of the cylinder body 12a, the pressure cylinder part 12c1, and the flange part 12c2. The first hydraulic chamber R3 is connected to the second hydraulic chamber R4 through an oil passage 25 connected to a port PT1 and through a port PT3.

The servo chamber R5 is formed between the partition part 12a2 and the pressure cylinder part 12c1 of the first master piston 12c. The servo chamber R5 is formed to be demarcated by the inner peripheral surface of the cylinder body 12a, the partition part 12a2, the protruding part 12c3 of the first master piston 12c, and the pressure cylinder part 12c1. The servo chamber R5 is connected to an output chamber R12 through an oil passage 26 connected to a port PT2.

A pressure sensor 26a is a sensor detecting a servo pressure supplied to the servo chamber R5, which is connected to the oil passage 26. The pressure sensor 26a transmits a detected result to the brake ECU 6. The servo pressure detected by the pressure sensor 26a is an actual value of a hydraulic pressure in the servo chamber R5, which is hereinafter called an actual servo pressure.

The stroke simulator part 13 includes the cylinder body 12a, the input piston 12b, the first hydraulic chamber R3 and a stroke simulator 13a communicating with the first hydraulic chamber R3.

The first hydraulic chamber R3 communicates with the stroke simulator 13a through oil passages 25, 27 connected to the port PT1. The first hydraulic chamber R3 communicates with the reservoir 14 through a not-shown connection oil passage.

The stroke simulator 13a generates a reaction force with a magnitude corresponding to an operation state of the brake pedal 11 in the brake pedal 11. The stroke simulator 13a includes a cylinder part 13a1, a piston part 13a2, a reaction-force hydraulic chamber 13a3, and a spring 13a4. The piston part 13a2 slides liquid-tightly inside the cylinder part 13a1 together with a brake operation operating the brake pedal 11. The reaction-force hydraulic chamber 13a3 is formed to be demarcated between the cylinder part 13a1 and the piston part 13a2. The reaction-force hydraulic chamber 13a3 communicates with the first hydraulic chamber R3 and the second hydraulic chamber R4 through the connected oil passages 27, 25. The spring 13a4 biases the piston part 13a2 in a direction of reducing a capacity of the reaction-force hydraulic chamber 13a3.

In the oil passage 25, a first solenoid valve 25*a* as a normally-closed type solenoid valve is provided. In an oil passage 28 connecting the oil passage 25 to the reservoir 14, a second solenoid valve 28*a* as a normally-open type solenoid valve is provided. When the first solenoid valve 25*a* is in a closed state, the first hydraulic chamber R3 and the second hydraulic chamber R4 are disconnected. When the first solenoid valve 25*a* is in the closed state and the second solenoid valve 28*a* is in an open state, the input piston 12*b* and the first master piston 12*c* move together while keeping a fixed clearance therebetween. When the first solenoid valve 25*a* is in an open state, the first hydraulic chamber R3 communicates with the second hydraulic chamber R4.

Furthermore, a pressure sensor 25*b* is installed in the oil passage 25. The pressure sensor 25*b* is a sensor detecting hydraulic pressures in the second hydraulic chamber R4 and the first hydraulic chamber R3. The pressure sensor 25*b* is also a sensor detecting a stepping force with respect to the brake pedal 11. The pressure sensor 25*b* transmits a detected result to the brake ECU 6.

The booster mechanism 15 generates the servo pressure in the servo chamber R5 in accordance with the stroke and/or the stepping force. The booster mechanism 15 is a hydraulic pressure generation device outputting an output pressure (servo pressure) by an inputted input pressure (a later-described pilot pressure) being operated. The booster mechanism 15 is also a device generating a response delay of the output pressure with respect to the input pressure when starting increasing the pressure or starting reducing the pressure in a case where the output pressure is increased or reduced from a non-operation state or a state where the output pressure is held. The booster mechanism 15 has a regulator 15*a* and a pressure supply device 15*b*.

The regulator 15*a* includes a cylinder body 15*a*1 and a spool 15*a*2 sliding inside the cylinder body 15*a*1. In the regulator 15*a*, a pilot chamber R11, the output chamber R12, and a third hydraulic chamber R13 are formed.

The pilot chamber R11 is formed to be demarcated by the cylinder body 15*a*1 and a front end surface of a second large-diameter part 15*a*2*b* of the spool 15*a*2. The pilot chamber R11 is connected to a pressure-reducing valve 15*b*6 and a pressure-increasing valve 15*b*7 connected to a port PT11. A regulating protrusion 15*a*4 on which the front end surface of the second large-diameter part 15*a*2*b* of the spool 15*a*2 abuts to be positioned is provided on an inner peripheral surface of the cylinder body 15*a*1.

The output chamber R12 is formed to be demarcated by the cylinder body 15*a*1, a small-diameter part 15*a*2*c* of the spool 15*a*2, a rear end surface of the second large-diameter part 15*a*2*b*, and a front end surface of a first large-diameter part 15*a*2*a*. The output chamber R12 is connected to the servo chamber R5 through the oil passage 26 connected to the port PT12 and through the port PT2. The output chamber R12 also can be connected to an accumulator 15*b*2 through an oil passage 32 connected to a port PT13.

The third hydraulic chamber R13 is formed to be demarcated by the cylinder body 15*a*1 and a rear end surface of the first large-diameter part 15*a*2*a* of the spool 15*a*2. The third hydraulic chamber R13 can be connected to a reservoir 15*b*1 through an oil passage 33 connected to a port PT14. Moreover, a spring 15*a*3 biasing the spool 15*a*2 in a direction of expanding the third hydraulic chamber R13 is arranged inside the third hydraulic chamber R13.

The spool 15*a*2 includes the first large-diameter part 15*a*2*a*, the second large-diameter part 15*a*2*b*, and the small-diameter part 15*a*2*c*. The first large-diameter part 15*a*2*a* and the second large-diameter part 15*a*2*b* are formed so as to be slidable inside the cylinder body 15*a*1. The small-diameter part 15*a*2*c* is arranged between the first large-diameter part 15*a*2*a* and the second large-diameter part 15*a*2*b*. The small-diameter part 15*a*2*c* is formed integrally with the first large-diameter part 15*a*2*a* and the second large-diameter part 15*a*2*b*. The small-diameter part 15*a*2*c* is formed to have a smaller diameter than the first large-diameter part 15*a*2*a* and the second large-diameter part 15*a*2*b*.

Moreover, a communication path 15*a*5 allowing the output chamber R12 to communicate with the third hydraulic chamber R13 is formed in the spool 15*a*2.

The pressure supply device 15*b* functions as a drive unit driving the spool 15*a*2. The pressure supply device 15*b* includes the reservoir 15*b*1 as a low-pressure source, the accumulator 15*b*2 as a high-pressure source storing the brake fluid, a pump 15*b*3 sucking the brake fluid in the reservoir 15*b*1 and discharges the brake fluid to the accumulator 15*b*2, and an electric motor 15*b*4 driving the pump 15*b*3. A hydraulic pressure in the reservoir 15*b*1 is lower than that in the accumulator 15*b*2, which is the same level as the atmospheric pressure. The pressure supply device 15*b* has a pressure sensor 15*b*5 detecting the hydraulic pressure in the accumulator 15*b*2 and outputting the detected result to the brake ECU 6.

The pressure supply device 15*b* further has the pressure-reducing valve 15*b*6 and the pressure-increasing valve 15*b*7. The pressure-reducing valve 15*b*6 is a normally-open type solenoid valve, a flow rate of which is controlled by the brake ECU 6. One port of the pressure-reducing valve 15*b*6 is connected to the pilot chamber R11 through an oil passage 31 and the other port of the pressure-reducing valve 15*b*6 is connected to the reservoir 15*b*1 through an oil passage 34. The pressure-increasing valve 15*b*7 is a normally-closed type solenoid valve, a flow rate of which is controlled by the brake ECU 6. One port of the pressure-increasing valve 15*b*7 is connected to the pilot chamber R11 through the oil passage 31. The other port of the pressure-increasing valve 15*b*7 is connected to the accumulator 15*b*2 through an oil passage 35 and the oil passage 32 to which the oil passage 35 is connected.

When the pressure-reducing valve 15*b*6 is opened, the pilot chamber R11 communicates with the reservoir 15*b*1, and a pilot pressure as a hydraulic pressure in the pilot chamber R11 is reduced. When the pressure-increasing valve 15*b*7 is opened, the pilot chamber R11 communicates with the accumulator 15*b*2, and the pilot chamber is increased. Both the pressure-reducing valve 15*b*6 and the pressure-increasing valve 15*b*7 are closed, the pilot chamber R11 is sealed.

Here, the operation of the regulator 15*a* is briefly explained. In a case where the pilot pressure as the hydraulic pressure in the pilot chamber R11 is not generated, the spool 15*a*2 is biased by the spring 15*a*3 and is in an initial position (see FIG. 1). The initial position of the spool 15*a*2 is a position where the front end surface of the spool 15*a*2 abuts on the regulating protrusion 15*a*4 and positioned, and a position just before the rear end surface of the spool 15*a*2 blocks the port PT14.

When the spool 15*a*2 is in the initial position as described above, the port PT14 communicates with the port PT12 through the communication path 15*a*5, and the port PT13 is blocked by the spool 15*a*2.

When the pilot pressure is increased, the spool 15*a*2 moves rearward. When the increased pressure of the pilot pressure is continued, the spool 15*a*2 in the initial position moves to a position where the port PT13 which has been blocked by the spool 15*a*2 is opened. The port PT14 which has been opened is blocked by the spool 15a2. The position of the spool 15a2 in this state is called an "increased pressure position". At this time, the port PT13 communicates with the port PT12 through the output chamber R12.

As a pressing force added to the front end surface of the second large-diameter part 15a2b of the spool 15a2 balances with a resultant force of a force corresponding to the servo pressure and a biasing force of the spring 15a3, the spool 15a2 is stopped. A position of the spool 15a2 where the port PT13 and the port PT14 are blocked by the spool 15a2 is called a "holding position".

When the pilot pressure is reduced, the spool 15a2 positioned in the holding position moves forward. Even when the reduced pressure is continued, the blocked state of the port PT13 is maintained. On the other hand, the port PT14 which has been blocked is opened. A position of the spool 15a2 in this state is called a "reduced pressure position". At this time, the port PT14 communicates with the port PT12 through the communication path 15a5.

As described above, the booster mechanism 15 generates the pilot pressure in the pilot chamber R11 in accordance with the stroke of the brake pedal 11 by the pressure-reducing valve 15b6 and the pressure-increasing valve 15b7. Then, the booster mechanism 15 generates the servo pressure corresponding to the stroke of the brake pedal 11 in the servo chamber R5 by the pilot pressure. The master pistons 12c, 12d are driven by the servo pressure, and master pressures corresponding to the servo pressure are generated in the master chambers R1, R2. The master cylinder 12 supplies the master pressures corresponding to the stroke to the wheel cylinders WC through the actuator 5.

The actuator 5 is a device adjusting hydraulic pressures (wheel pressures) of the wheel cylinders WC in accordance with an instruction of the brake ECU 6. The actuator 5 includes not-shown plural solenoid valves, a pump, a reservoir and so on. The actuator 5 is provided with two hydraulic systems. In one hydraulic system, the oil passage 24 is connected to the wheel cylinders WC of the rear wheels W. In the other hydraulic system, the oil passage 22 is connected to the wheel cylinders WC of the front wheels W. The actuator 5 is configured to execute pressure-increasing control for providing the master pressures to the wheel cylinders WC, holding control for holding the wheel pressures and pressure-reducing control for reducing the wheel pressures. The actuator 5 according to the embodiment is configured to further execute pressurizing control for increasing (pressurizing) the wheel pressures by operating the pump and the solenoid valves. The actuator 5 is a well-known ESC actuator, the detailed explanation of which is omitted.

The regenerative braking system 101 is a different device from the hydraulic braking system 100. The regenerative braking system 101 includes a not-shown power generator, an inverter, a hybrid ECU and so on. The brake ECU 6 is configured to communicate with the hybrid ECU. Since the details of the regenerative braking system 101 is well-known, explanation is omitted.

The brake ECU 6 is an electronic control unit having a CPU, a memory and so on. The brake CU 6 sets a target braking force (which can be paraphrased into a required control force or a target deceleration) based on a stroke and/or a stepping force. The brake ECU 6 sets a variation gradient of the target braking force in accordance with a variation gradient of the stroke. The brake ECU 6 controls the booster mechanism 15, the actuator 5, and the regenerative braking system 101 in accordance with the target braking force and a vehicle condition.

The brake ECU 6 sets a target servo pressure or a target master pressure based on the target braking force in a condition where the hydraulic braking system 100 is mainly operated (a later-described first condition). The brake ECU 6 controls the booster mechanism 15 based on a target upstream pressure as the target servo pressure or the target master pressure and a variation gradient of the target upstream pressure. Briefly explaining the control for the booster mechanism 15 by the brake ECU 6, the pressure-increasing valve 15b7 is in the opened state and the pressure-reducing valve 15b6 is in the closed state in the pressure-increasing control. In the pressure-reducing control, the pressure-increasing valve 15b7 is in the closed state and the pressure-reducing valve 15b6 is in the open state. In the holding control, the pressure-increasing valve 15b7 and the pressure-reducing valve 15b6 are in the closed state.

The brake ECU 6 adjusts the wheel pressures by controlling the actuator 5 when executing antiskid control, for example. The brake ECU 6 estimates current wheel pressures based on the control state of the actuator 5 and an upstream pressure (the master pressure or the servo pressure). In a case where a pressure sensor for detecting the wheel pressure is provided in the vehicle, the brake ECU 6 can use a detected result of the pressure sensor.

On the other hand, in a condition where the regenerative braking system 101 is mainly operated (a later-described second condition), the brake ECU 6 transmits information of the target braking force to the hybrid ECU (the regenerative braking system 101). The hybrid ECU transmits information of an actually-generated regenerative braking force (performed-regenerative braking force) in the target braking force to the brake ECU 6. When the performed-regenerative braking force is insufficient with respect to the target braking force, the brake ECU 6 compensates for a shortage with the hydraulic braking force by the booster mechanism 15 and/or the actuator 5. As described above, the brake ECU 6 executes regenerative cooperation control with respect to the hydraulic braking system 100 and the regenerative braking system 101.

Control Relating to Change of Effect of Braking

The brake ECU 6 applies control current corresponding to an instruction servo pressure obtained by multiplying the target servo pressure by a gain to the pressure-increasing valve 15b7 as feed-forward control at the time of increasing the braking force by the hydraulic braking system 100. The brake ECU 6 arithmetically operates a difference between the instruction servo pressure and the actual servo pressure (hereinafter referred to as also a "first differential pressure"). Specifically, the brake ECU 6 calculates the first differential pressure by arithmetically operating a difference between an expected servo pressure obtained by converting the instruction servo pressure into a value of the same dimension as the pressure sensor 26a and a detected value of the pressure sensor 26a. The brake ECU 6 adjusts the magnitude of the control current to be applied to the pressure-increasing valve 15b7 in accordance with the first differential pressure as feed-back control. For example, the larger the first differential pressure (the expected pressure>actual servo pressure) is, the larger the control current to the pressure-increasing valve 15b7 is at the time of pressure-increasing control, as a result, an opening of the pressure-increasing valve 15b7 is increased.

As described above, the magnitude of the instruction servo pressure is determined by the magnitude of the gain in the hydraulic braking system 100. As the larger the gain is, the larger the instruction servo pressure becomes; therefore, the actual servo pressure is increased as a result of control and the effect of braking is increased. The gain can be called a value correlating to the effect of the braking, namely, an "effect correlation value". The brake ECU 6 previously stores a first gain map as the relationship between the variation gradient of the target upstream pressure or the variation gradient of the stroke and the gain.

As the variation gradient of the target upstream pressure corresponds to the variation gradient of the target braking force, the first gain map can be defined as the relationship between the variation gradient of the target braking force and the gain. That is, the brake ECU 6 changes the effect correlation value (the gain in this case) correlating to the effect of the braking in the hydraulic braking system 100 in accordance with the variation gradient of the target braking force. The larger the variation gradient of the target braking force (hereinafter referred to as a "target variation gradient") is, namely, the higher the operation speed of the brake pedal 11 is, the larger the effect correlation value becomes. The brake ECU 6 according to the embodiment changes the effect correlation value in accordance with the vehicle condition.

The brake ECU 6 includes a control part 61 and a setting part 62. When the vehicle condition is the first condition, the control part 61 generates the braking force by at least one of the hydraulic braking system 100 and the regenerative braking system 101 based on a braking distribution ratio that is different from that in a case where the vehicle condition is the second condition. The braking distribution ratio is a ratio of the hydraulic braking force and the regenerative braking force to be generated with respect to the target braking force. The hydraulic braking force is a braking force generated by the hydraulic braking system 100, and the regenerative braking force is a braking force generated by the regenerative braking system 101.

The braking distribution ratio corresponds to priority in generating the braking force with respect to the hydraulic braking system 100 and the regenerative braking system 101, or priority in selecting the braking system. That is, the control part 61 sets which of the hydraulic braking force and the regenerative braking force is preferentially generated. In other words, the control part 61 sets which of the hydraulic braking system 100 and the regenerative braking system 101 is mainly operated. The control part 61 tries to achieve the target braking force by, for example, the braking system with a high braking distribution ratio (priority), and generates a shortage of the braking force by the braking system with a low braking distribution ratio in the case where the braking force is insufficient.

The control part 61 according to the embodiment sets the braking distribution ratio in accordance with a vehicle speed. That is, the first condition is a condition in which the vehicle speed is lower than a prescribed value (low-speed running condition), and the second condition is a condition in which the vehicle speed is equal to or higher than the prescribed value (middle-to-high speed running condition) in the embodiment. When the vehicle condition is the first condition, the control part 61 sets the hydraulic braking system 100 as the main braking system and generates the hydraulic braking force preferentially with respect to the target braking force. On the other hand, when the vehicle condition is the second condition, the control part 61 sets the regenerative braking system 101 as the main braking system and generates the regenerative braking force preferentially with respect to the target braking force. When the vehicle condition is the first condition, the control part 61 controls the booster mechanism 15 and/or the actuator 5 so that all of the target braking force is achieved by the hydraulic braking force.

In the configuration of the embodiment, the braking system to be preferentially used differs even in a slight difference in the vehicle speed, that is, for example, in a difference between a vehicle speed slightly higher than a vehicle speed threshold and a vehicle speed slightly lower than the vehicle speed threshold. A change in a brake feeling due to the change of the main braking system occurs to no small extent in a system having plural braking systems different from each other (for example, a hybrid vehicle and so on).

Figure 2:
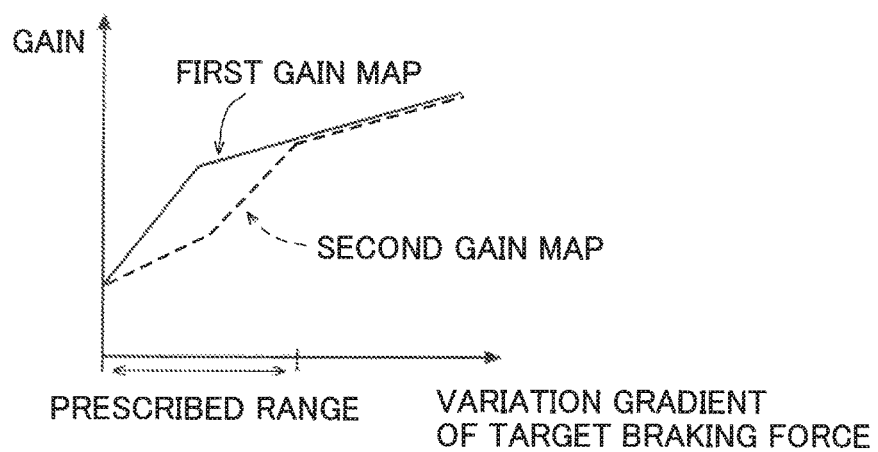
FIG. 2 is an explanatory view for explaining gain maps according to the embodiment.

The setting part 62 sets gains (gains with respect to the target variation gradient within a prescribed range in the embodiment) so as to be different in the case where the vehicle condition is the first condition and in the case where the vehicle condition is the second condition. The brake ECU 6 stores plural maps indicating the relationship between the target variation gradient and gains. Specifically, the brake ECU 6 stores the first gain map and a second gain map as shown in FIG. 2.

The first gain map and the second gain map are set so that gain values with respect to the target variation gradient are different from each other in a prescribed range (low-operation speed range). In other words, there is a part in which variation gradients of gains with respect to the target variation gradient differ from each other in the first gain map and the second gain map. Specifically, gains of the second gain map are smaller than gains of the first gain map in the low-operation speed range. Gains in a high-operation speed range are set to the same values in the first gain map and the second gain map so as to respond to a sudden braking operation regardless of the condition.

The setting part 62 switches the gain maps so as to correspond to the timing when the control part 61 switches the braking distribution ratio (priority). That is, when the vehicle condition is the first condition, the setting part 62 sets gains (the gains with respect to the target variation gradient within the prescribed range in the embodiment) to be smaller than gains in the case where the vehicle condition is the second condition. According to the embodiment, the gain changes not only due to the change of the target variation gradient but due to the change of the braking distribution ratio. A threshold (condition) for switching the gain maps is set according to the vehicle speed, which corresponds to the vehicle speed at which the braking distribution ratio is switched.

Advantages

The brake ECU 6 as a braking controller of the embodiment is a device changing the gain correlating to the effect of the braking in the hydraulic braking system 100 provided in the vehicle in accordance with the vehicle condition of the vehicle, including the control part 61 generating the braking force by at least one of the hydraulic braking system 100 and the regenerative braking system 101 in the case where the vehicle state is the first condition based on the braking distribution ratio different from that in the case where the vehicle condition is the second condition, and the setting part 62 setting the gains so as to be different from each other in the case where the vehicle condition is the first condition and the case where the vehicle condition is the second condition.

According to the configuration, the gain map is changed at the timing when the braking distribution ratio is changed;

therefore, it is possible to prevent the driver from sensing a change in the brake feeling generated by switching the gain map. The effect of braking obtained when the driver steps on the brake pedal 11 differs in the first gain map and the second gain map, and the change in the brake feeling occurs. However, the gain map is switched so as to correspond to the change in the brake feeling by changing the braking distribution ratio originally allowed for the driver in the embodiment; therefore, the driver does not easily feel the change in the brake feeling by switching the gain map. That is, according to the embodiment, it is possible to suppress the sense of incongruity given to the driver caused by switching the gain map.

As the setting part 62 reduces the gain in the low-speed running condition (the first condition in the embodiment), the first differential pressure in the low-speed running condition can be suppressed small. When the brake ECU 6 increases the control current in response to the expansion of the first differential pressure due to the response delay in the system in which the response delay in the actual pressure with respect to the instruction pressure occurs, a sudden pressure increase of the actual pressure with respect to the target variation gradient is generated as a result. Though the related-art gain map is set in consideration of the response delay, the setting corresponds to a middle-to-high speed running condition. Therefore, the sense of incongruity given to the driver due to the sudden pressure increase of the actual pressure tends to be increased in the low-speed running condition.

However, the first differential pressure in the low-speed running condition can be suppressed small and the sudden pressure increase of the actual pressure can be suppressed according to the embodiment, as a result, it is possible to suppress the sense of incongruity given to the driver. Moreover, the gain map (the second gain map in the embodiment) corresponding to the low-speed running is used during the low-speed running in which the magnitude of the braking force tends to affect the quality of the brake feeling, which can improve the brake feeling.

In the embodiment, the brake ECU 6 executes the regenerative cooperation control in the vehicle braking system having the hydraulic braking system 100 generating the hydraulic braking force and the regenerative braking system 101 generating the regenerative braking force. According to the configuration, the main braking system is switched at the time of middle-to-high speed running during which the regenerative braking force can be stably generated and at the time of low-speed running. Accordingly, the change of the gain map for suppressing the sudden pressure increase of the actual pressure at the time of low-speed running to improve the brake feeling can be matched to the timing of switching the braking system without waste. That is, the switching of the braking system and the switching of the gain map can be performed effectively (simultaneously) as well as the brake feeling can be improved according to the embodiment. Furthermore, types of the braking force differ in the hydraulic braking force and the regenerative braking force; therefore, the change in the brake feeling may relatively often appear at the time of switching. However, the change is allowed for the driver, and the driver further does not easily feel the change of the gain map.

Others

The present invention is not limited to the above embodiment. For example, one braking system may be an electric parking brake. The electric parking brake is configured by including a brake caliper provided with a motor, for example. In a case where a braking distribution ratio between the hydraulic braking system 100 and the electric parking brake is controlled, the brake ECU 6 may change the gain map in accordance with the change of the braking distribution ratio. One braking system may be the booster mechanism 15 and the other braking system may be the actuator 5. The brake feeling differs when characteristics such as response differ even in systems generating the same hydraulic braking force. For example, a relatively high braking force is not necessary at the time of low-speed running, and the actuator 5 having good response can be used as a main braking system. The brake ECU 6 may change the gain map at the time of changing the braking distribution ratio between the booster mechanism 15 and the actuator 5.

The division of vehicle conditions may be performed not only in accordance with the level of the vehicle speed but also, for example, in accordance with an effect of a brake pad provided in the vehicle. That is, the first condition may be a condition in which the effect of the brake pad is relatively high and the second condition may be a condition in which the effect of the brake pad is relatively low. The brake ECU 6 may change the braking distribution ratio as well as the gain map when a fade state is detected by a well-known method. Moreover, for example, the first condition may be a condition in which the vehicle travels forward and the second condition may be a condition in which the vehicle travels backward. Also in this case, the brake ECU 6 may change the braking distribution ratio as well as the gain map in accordance with a travelling direction of the vehicle.

The effect correlation value is used for comparing the target braking force with the actual braking force, which may also be called a weight (coefficient) with respect to the target braking force. The effect correlation value may be, for example, a friction coefficient or the like of the brake pad. The actuator 5 may be a so-called ABS actuator not having a pressurization function. Moreover, the part in which the first gain map differs from the second gain map may be the entire range, not limited to the prescribed range.

What is claimed is:

1. A brake controller generating a braking force by at least one of a first braking system and a second braking system which is different from the first braking system, under a first condition in which a vehicle speed is lower that a prescribed value, based on a braking distribution ratio which is different from that of a second condition in which the vehicle speed is equal to or more than the prescribed value, the brake controller comprising:
   a control part setting a target servo pressure based on a stroke of a brake pedal, setting a gain based on a variation gradient of the stroke, calculating an instruction servo pressure by multiplying the target servo pressure by the gain, and generating the braking force by the first braking system based on the instruction servo pressure; and
   a setting part setting the gain of the first condition to be smaller than that of the second condition.

2. A braking arrangement, comprising:
   a first braking system;
   a second braking system which is different from the first braking system; and
   a brake controller configured to:
   generate a braking force by at least one of the first braking system and the second braking system, under a first condition in which a vehicle speed is lower that a prescribed value, based on a braking distribution ratio which is different from that of a second condition in which the vehicle speed is equal to or more than the prescribed value, set a target servo pressure based on a stroke of a brake pedal, setting a gain based on a variation gradient of the stroke, calculate an instruction servo pressure by multiplying the target servo pressure by the gain, generating the braking force by the first braking system based on the instruction servo pressure, and set the gain of the first condition to be smaller than that of the second condition.

\* \* \* \* \*